Sept. 15, 1925.

H. H. THEIS

REPAIR PATCH

Filed May 26, 1924

1,553,883

Hugh H. Theis
Inventor

Patented Sept. 15, 1925.

1,553,883

UNITED STATES PATENT OFFICE.

HUGH HENRY THEIS, OF TAYLOR, TEXAS.

REPAIR PATCH.

Application filed May 26, 1924. Serial No. 716,048.

*To all whom it may concern:*

Be it known that I, HUGH H. THEIS, a citizen of the United States, residing at Taylor, in the county of Williamson and State of Texas, have invented new and useful Improvements in Repair Patches, of which the following is a specification.

This invention relates to means for the repair of pneumatic tires, tubes, foot-ball and punching bag bladders, hot water bottles, etc., in fact, any such similar devices wherein it is required that an air and liquid proof patch or repair be made.

The primary object of the invention is to provide a patch of such character that the use of cements and other such adhesives will not be required in the application of the patch to the tire, whereby a great saving of time is effected.

A further object of the invention is to provide a patch of such character and applied in such manner that it does not require the exercise of special skill or the use of special instruments in effecting a perfect repair of the injured element.

A still further object of the invention is to provide patch material constructed and assembled in such manner that the same is at all times ready for use and does not need cements, adhesives or other such agencies in effecting the repair.

A still further and particular object of the invention is to provide a patch so constructed as to be capable of flexing to an equal or greater extent than the element repaired, thus enabling the same to conform to variations in sizes and to adapt itself to variations in air and liquid pressures within the element repaired.

A still further object of the invention is to provide a patch so applied to the injured member as to prevent creeping of the same, in instances where it is used in connection with the inflatable tires of motor vehicles, and which adheres itself to the tire as to be incapable of working loose from the base to which it is secured.

With these and other objects in view, the invention consists of the features of construction, combination and arrangement of parts, hereinafter fully described and claimed, reference being had to the accompanying drawing, in which:—

Figure 1:
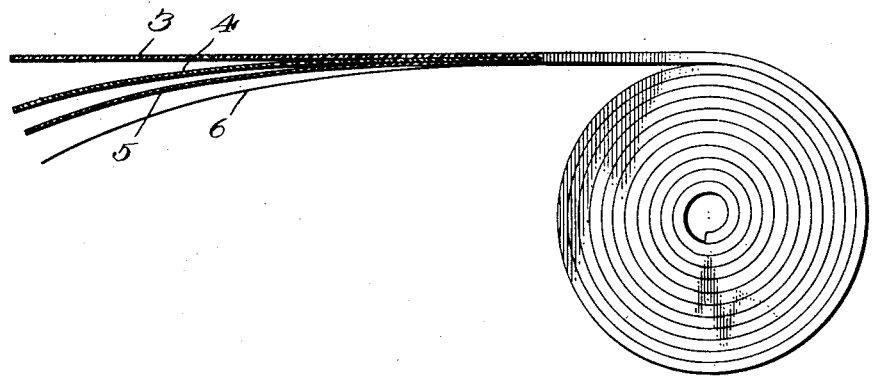
Figure 2:
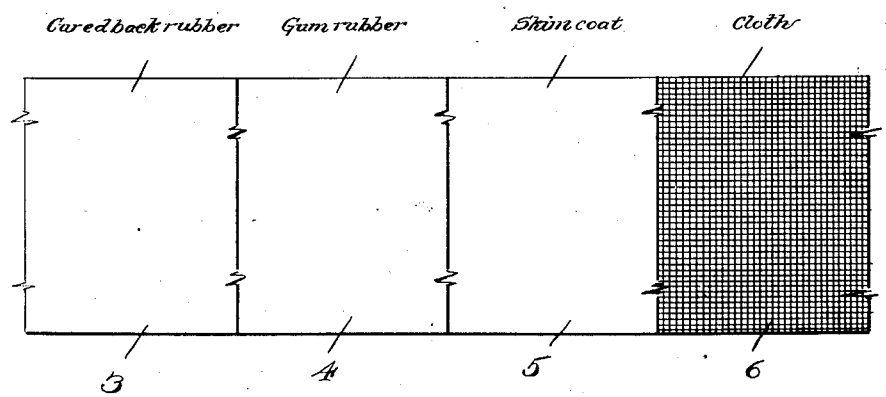

Figure 1 of the drawing represents the improved patch as it will appear when ready for use in rolled form, a part of the patch being shown in section and the various elements constituting the same being separated to clearly disclose the manner of assembly, and Figure 2 is a face view of the patch, the several layers thereof being broken away at different points to indicate the various underlying layers.

In carrying out the invention a suitable base or foundation is employed, in the present instance a cured back or vulcanized rubber, indicated in the drawing at 3. This rubber is cut into elongated strips of the size most convenient for use in the repair of inner tubes of motor vehicle wheels, hot water bottles, and other air or liquid containing vessels. One surface of the foundation or cured rubber is coated or has applied thereto a layer of gum rubber indicated at 4, the same corresponding in length and breadth with the foundation 3. The gum rubber adheres tightly to the foundation 3 and forms a part thereof, so to speak.

The exposed surface of the gum rubber layer 4 is provided with what I term a skim coat indicated at 5, the use of which is to effectually adhere the gum and rubber layers heretofore described to the tube or other element to be repaired. This skim coat comprises preferably a mixture of benzine and a cold patch cement generally known and used in connection with such repairs. This mixture may consist of two parts benzine to one part of cold patch cement, and the skim coat fully covers the exposed surface of the gum layer 4 and is coextensive therewith.

As a protector for the skim coat above-described, and to maintain the same against sticking or adhering when the patch is rolled, as well as to prevent moisture gaining access to the gum rubber and skim coat, the exposed surface of this skim coat is covered with a suitable cloth 6 treated in such a way as to render the same moisture-proof. This cloth may be starched to effect this result.

When the patch has been made up of the various layers and in the manner above described, it is rolled as shown in Figure 1 and when kept in this manner is always ready for use. When it is desired to make a repair, the surface next adjacent to the ruptured place may be roughened and preferably cleaned in the usual manner, and a portion of the patch of suitable size to fully cover the rupture is applied thereto. First, however, the protective cloth 6 is removed so that the skim coat is exposed, and this coat lies next adjacent to the ruptured element. After the patch has been pressed firmly down around all the edges the patch will firmly secure and seal itself to the ruptured member. By reason of the fact that the various layers of the patch are formed of rubber or readily expansible and contractile material, it is apparent that the patch will adapt itself readily to various pressures to which the injured element may be subjected and will expand and contract as the condition requires. The skim coat formulated in the manner specified, while tightly adhering the patch element to the broken member, is proof, furthermore, against creeping of the patch when used in connection with inner tubes between the tube and the tire casing.

Having thus fully described my invention, I claim:—

1. A patch comprising a sheet of cured rubber, a layer of gum rubber applied to one surface of said sheet, a skim coat applied to the surface of said layer of gum rubber and comprising a mixture of benzine and cold patch cement, and a protective covering for said skim coat comprising a starched fabric sheet.

2. A patch of the character described comprising a layer of cured rubber, a layer of gum rubber applied to one side of said layer of cured rubber, a skim coat applied to the outer face of the layer of gum rubber, said skim coat comprising a mixture of two parts benzine to one part of cold patch cement, and a protective covering for said skim coat comprising a fabric sheet impregnated with starch.

In testimony whereof I affix my signature.

HUGH HENRY THEIS.